United States Patent
Sun

(10) Patent No.: US 11,343,741 B2
(45) Date of Patent: May 24, 2022

(54) DATA TRANSMISSION METHOD AND DEVICE BASED ON MOBILE NETWORK, AND STORAGE MEDIUM

(71) Applicant: Beijing Xiaomi Mobile Software Co., Ltd., Beijing (CN)

(72) Inventor: Daliang Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/990,545

(22) Filed: Aug. 11, 2020

(65) Prior Publication Data

US 2021/0289411 A1    Sep. 16, 2021

(30) Foreign Application Priority Data

Mar. 13, 2020   (CN) .......................... 202010176036.0

(51) Int. Cl.
  *H04W 4/00*  (2018.01)
  *H04M 1/00*  (2006.01)
  *H04W 36/12*  (2009.01)
  *H04W 8/18*  (2009.01)
  *H04W 36/30*  (2009.01)
  *H04W 48/16*  (2009.01)

(52) U.S. Cl.
  CPC ........... *H04W 36/12* (2013.01); *H04W 8/183* (2013.01); *H04W 36/30* (2013.01); *H04W 48/16* (2013.01)

(58) Field of Classification Search
  CPC ..... H04W 36/12; H04W 8/183; H04W 36/30; H04W 48/16
  USPC ....................................................... 370/331
  See application file for complete search history.

(56) References Cited

U.S. PATENT DOCUMENTS

| 2013/0012208 | A1 | 1/2013 | Jeong |
| 2013/0244597 | A1 | 9/2013 | Kawamoto |
| 2014/0274006 | A1 | 9/2014 | Mutya et al. |
| 2015/0092611 | A1 | 4/2015 | Ponukumati et al. |
| 2016/0142946 | A1 | 5/2016 | Ponukumati et al. |

(Continued)

FOREIGN PATENT DOCUMENTS

| CN | 101309135 A | 11/2008 |
| CN | 102547266 A | 7/2012 |
| CN | 103391640 A | 11/2013 |

(Continued)

OTHER PUBLICATIONS

Extended European Search Report in European Application No. 20194016.0, dated Feb. 18, 2021.

(Continued)

*Primary Examiner* — Mark G. Pannell
(74) *Attorney, Agent, or Firm* — Finnegan, Henderson, Farabow, Garrett & Dunner, L.L.P.

(57) ABSTRACT

A data transmission method based on a mobile network, applied to a terminal configured with a primary card link for a primary subscriber identity module (SIM) card and a secondary card link for a secondary SIM card, includes: performing transmission quality evaluation on the primary card link when the primary card link is applied to perform data transmission of the mobile network to obtain a first transmission quality evaluation value; and compensating the data transmission of the mobile network performed by the primary card link through the secondary card link in response to that the first transmission quality evaluation value is lower than a transmission quality evaluation threshold.

14 Claims, 5 Drawing Sheets

(56) References Cited

U.S. PATENT DOCUMENTS

2019/0342943 A1 11/2019 Rice et al.
2020/0329528 A1 10/2020 Rice et al.

FOREIGN PATENT DOCUMENTS

| | | |
|---|---|---|
| CN | 105208205 A | 12/2015 |
| CN | 105491683 A | 4/2016 |
| CN | 105682085 A | 6/2016 |
| CN | 106658629 A | 5/2017 |
| CN | 106792829 A | 5/2017 |
| CN | 109818881 A | 5/2019 |
| FR | 3007912 A1 | 1/2015 |
| JP | 2011-061253 A | 3/2011 |
| JP | 2014-027548 A | 2/2014 |
| JP | 2016-533660 A | 10/2016 |
| JP | 2020-010391 A | 1/2020 |
| KR | 10-2015-0132250 A | 11/2015 |
| WO | WO 2020192537 A1 | 10/2020 |

OTHER PUBLICATIONS

First Office Action dated Sep. 6, 2021, from the State Intellectual Property Office of People's Republic of China in counterpart Chinese Application No. 202010176036.0.
Notification of Reason for Refusal dated Sep. 29, 2021, from the Korean Intellectual Property Office in counterpart Korean Application No. 10-2020-0095605.
Notice of Reasons for Refusal dated Oct. 1, 2021, from the Japanese Patent Office in counterpart Japanese Application No. 2020-129249.

DATA TRANSMISSION METHOD AND DEVICE BASED ON MOBILE NETWORK, AND STORAGE MEDIUM

CROSS-REFERENCE TO RELATED APPLICATIONS

This application is based upon and claims priority to Chinese Patent Application No. 202010176036.0, filed on Mar. 13, 2020, the entire content of which is incorporated herein by reference.

TECHNICAL FIELD

The disclosure relates to the technical field of communication, and more particularly, to a data transmission method and device based on a mobile network, and a storage medium.

BACKGROUND

With the development of the communication technology, terminals supporting the dual subscriber identity module (SIM) dual standby (DSDS)/dual SIM dual active (DSDA) full-network configuration are constantly upgraded. For example, at present, terminals have been upgraded from full-network (4G+4G) to full-network (5G+4G), and even to the (5G+5G) network later.

In related art, a terminal supporting full-network configuration is configured with a primary data SIM card and a secondary data SIM card, and the terminal with two SIM cards or even multiple SIM cards performs data transmission of a mobile network based on a primary card link for the primary data SIM card. However, in the process of performing data transmission of the mobile network by using the primary card link, the problem of degraded transmission quality may occur.

SUMMARY

According to a first aspect of embodiments of the disclosure, a data transmission method based on a mobile network is provided. The data transmission method may be applied to a terminal. The terminal may be configured with a primary card link for a primary subscriber identity module (SIM) card and a secondary card link for a secondary SIM card. The method may include: performing transmission quality evaluation on the primary card link, in response to that the primary card link is applied to perform data transmission of the mobile network, to obtain a first transmission quality evaluation value; and compensating the data transmission of the mobile network performed by the primary card link through the secondary card link in response to that the first transmission quality evaluation value is lower than a transmission quality evaluation threshold.

According to a second aspect of embodiments of the disclosure, a data transmission device is provided. The data transmission device includes: a processor, and a memory configured to store instructions executable by the processor. The processor is configured to perform the data transmission method according to the first aspect.

It should be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of the specification, illustrate embodiments consistent with the disclosure, and explain the principles of the disclosure together with the specification.

DETAILED DESCRIPTION

Figure 1:
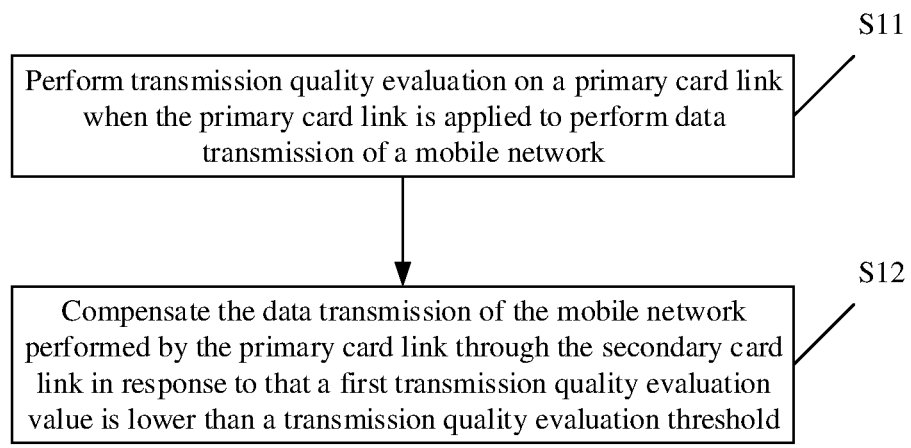
FIG. 1 is a flow chart of a data transmission method based on a mobile network according to an exemplary embodiment.

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Rather, they are merely examples of devices and methods consistent with some aspects of the disclosure as recited in the appended claims.

The data transmission method in the embodiments of the disclosure is applied to a terminal communicating based on DSDS/DSDA configuration. The terminal is configured with a primary card link for a primary SIM card and a secondary card link for a secondary SIM card during data transmission based on DSDS/DSDA configuration. For example, the terminal may be a 5G terminal supporting the 5G+4G network, or a 5G terminal supporting the 5G+5G network.

During the evolution process of the communication technology, a non-standalone/standalone (NSA/SA) networking mode is mainly adopted for a newly evolved network. However, at an initial stage of the deployment of the newly evolved network, some network problems often occur. At this time, if the primary card link of the terminal supporting DSDS/DSDA is a newly evolved network link, network abnormality problems may occur, thereby affecting data transmission. For example, at the initial stage of the deployment of the 5G network, the core networks of operators are not well supported, and thus, the problem of data interruption often occurs. In addition, the network deployment of the operators is not complete, a coverage area of the 5G network is less than a coverage area of the 4G network, and more 5G network devices need to be deployed in the same area due to the characteristics of the 5G network. Technical problems in the 5G network may cause problems in the terminal using the 5G network as the primary card link to perform data transmission based on the mobile network. For example, when a user uses a 5G mobile phone, the Internet function of the mobile phone of the user may be abnormal due to network problems. For example, the 5G network is slower than the 4G network, or even the mobile phone cannot get online. During the NSA/SA transition period, it may also cause instability of the 5G network.

Based on the above, the embodiments of the disclosure provide a data transmission method based on a mobile network. Transmission quality evaluation is performed on the primary card link when the primary card link is applied to perform data transmission of the mobile network. When the transmission quality of the primary card link is lower, the data transmission of the mobile network performed by the primary card link is compensated through the secondary card link. Load fault tolerance is realized by means of link balance between the primary card link and the secondary card link, thereby improving the data transmission quality.

FIG. 1 is a flow chart of a data transmission method based on a mobile network according to an exemplary embodiment. As illustrated in FIG. 1, the data transmission method is applied to a terminal. The terminal is configured with a primary card link for a primary SIM card and a secondary card link for a secondary SIM card based on DSDS/DSDA, and the primary card link and the secondary card link coexist. The data transmission method includes the following operations.

At S11, transmission quality evaluation is performed on the primary card link when the primary card link is applied to perform data transmission of a mobile network.

In the embodiments of the disclosure, a network state of the primary card link is determined by evaluating the transmission quality of the primary card link. In an embodiment, the evaluation of the transmission quality may be implemented by real-time measurement and quality evaluation of terminal background signals and link channel quality. The background signals may be signal parameters of a terminal modem. The signal parameters may include signal receiving strength and signal quality. In an embodiment, the signal parameters may be indicated by signal icons displayed in a terminal display interface. The link channel quality may be a link quality value, such as a link quality packet loss rate of wireless communication and/or network delay.

For convenience of description, a result obtained by performing transmission quality evaluation on the primary card link is referred to herein as a first transmission quality evaluation value. The level of the transmission quality evaluation value indicates the network state of the primary card link for performing data transmission. A network state of a high transmission quality evaluation value is better than a network state of a low transmission quality evaluation value. For example, when a signal parameter value is stronger, the transmission quality evaluation value is higher. When a packet loss rate is larger, the transmission quality evaluation value is lower.

In an embodiment, a transmission quality evaluation threshold for judging that the network state of the primary card link is poor may be set. When the data transmission quality value of the primary card link is lower than the set transmission quality evaluation threshold, it is determined that the network state of the primary card link is poor. The transmission quality evaluation threshold may be a preset empirical value.

In the embodiments of the disclosure, in response to that the first transmission quality evaluation value is lower than the transmission quality evaluation threshold, the data transmission of the mobile network performed by the primary card link is compensated through the secondary card link, and a communication termination instruction is received.

At S12, the data transmission of the mobile network performed by the primary card link is compensated through the secondary card link in response to that the first transmission quality evaluation value is lower than the transmission quality evaluation threshold.

In the embodiments of the disclosure, when the transmission quality of the primary card link is lower, the data transmission of the mobile network performed by the primary card link is compensated through the secondary card link. Load fault tolerance is realized by means of link balance between the primary card link and the secondary card link, thereby improving the data transmission quality.

In the following embodiments of the disclosure, the process that the data transmission of the mobile network performed by the primary card link is compensated through the secondary card link will be described.

In the embodiments of the disclosure, the terminal supports DSDS/DSDA configuration, and may establish a primary card link and a secondary card link at the same time. In the embodiments of the disclosure, transmission quality evaluation is performed on the primary card link and the secondary card link, and the data transmission of the mobile network performed by the primary card link is compensated through the secondary card link based on a transmission quality evaluation value of the primary card link and a transmission quality evaluation value of the secondary card link. For example, when the current terminal is in DSDS/DSDA dual-card (5G+4G) configuration, a 5G link and a 4G link may be established at the same time and coexist by inserting dual cards, and the data transmission of the mobile network performed by the 5G link may be compensated by the 4G link by means of real-time measurement and quality evaluation of background signals and link channels.

For convenience of description, the transmission quality evaluation value of the primary card link is referred to herein as a first transmission quality evaluation value, and the transmission quality evaluation value of the secondary card link is referred to herein as a second transmission quality evaluation value. The data transmission of the mobile network performed by the primary card link is compensated through the secondary card link based on the first transmission quality evaluation value and the second transmission quality evaluation value.

In an embodiment, when the data transmission of the mobile network performed by the primary card link is compensated through the secondary card link, the data to be transmitted may be distributed to the primary card link and the secondary card link according to a certain ratio, and then the data transmission of the mobile network is performed by the primary card link and the secondary card link, such that poor data transmission of the mobile network performed by the primary card link may be compensated by means of the capability of the secondary card link.

Figure 2:
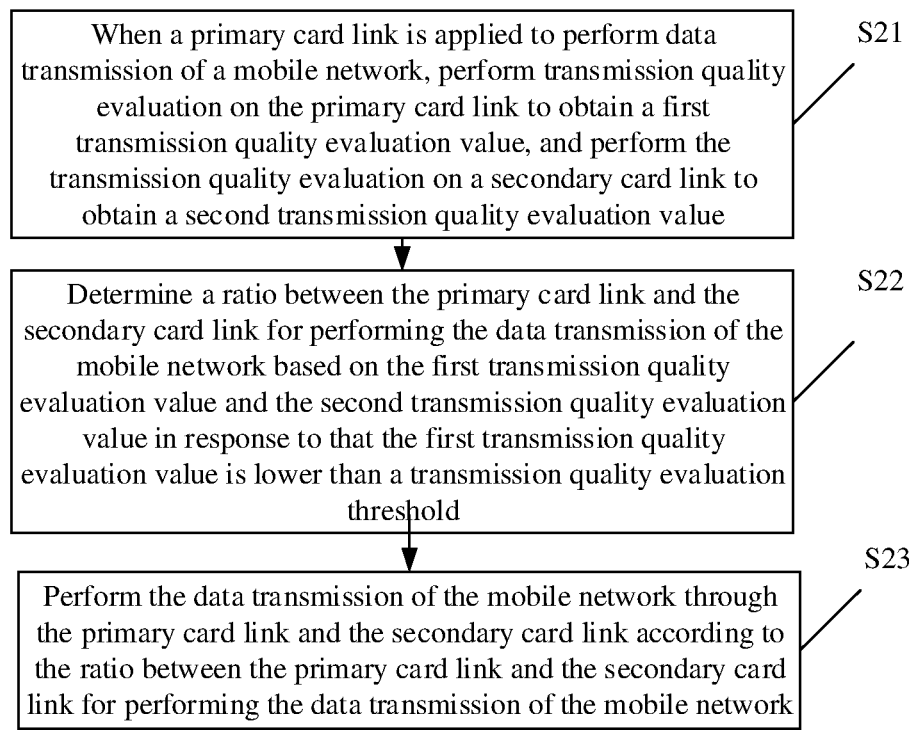
FIG. 2 is a flow chart of a data transmission method based on a mobile network according to an exemplary embodiment.

FIG. 2 is a flow chart of a data transmission method based on a mobile network according to an exemplary embodiment. As illustrated in FIG. 2, the data transmission method is applied to a terminal. The data transmission method includes the following operations.

At S21, when a primary card link is applied to perform data transmission of a mobile network, transmission quality evaluation is performed on the primary card link to obtain a first transmission quality evaluation value, and the transmission quality evaluation is performed on a secondary card link to obtain a second transmission quality evaluation value.

When transmission quality evaluation is performed on the primary card link and the secondary card link, quality evaluation may be performed based on signal parameters (such as signal receiving strength, signal quality, and the like) and a link quality packet loss rate of wireless communication, to obtain the first transmission quality evaluation value and the second transmission quality evaluation value.

At S22, a ratio between the primary card link and the secondary card link for performing the data transmission of the mobile network is determined based on the first transmission quality evaluation value and the second transmission quality evaluation value in response to that the first transmission quality evaluation value is lower than a transmission quality evaluation threshold.

In the embodiments of the disclosure, when the first transmission quality evaluation value is lower than the transmission quality evaluation threshold, a ratio may be determined for the data packets that the primary card link currently needs to transmit according to the quality evaluation results (the first transmission quality evaluation value and the second transmission quality evaluation value) of the primary card link and the secondary card link, and are distributed to the secondary card link according to the ratio.

For example, if network signal quality of the primary card link is lower than specified network signal quality, or if wireless communication link quality delay/packet loss rate of the primary card link is higher than specified delay/packet loss rate threshold, it may be determined that the first transmission quality evaluation value is lower than the transmission quality evaluation threshold. At this time, the data packets that the primary card link currently needs to transmit are distributed to the secondary card link according to a ratio.

In the embodiments of the disclosure, the ratio may be set according to actual conditions. For example, a ratio of a high transmission quality evaluation value is higher than a ratio of a low transmission quality evaluation value.

At S23, the data transmission of the mobile network is performed through the primary card link and the secondary card link according to the ratio between the primary card link and the secondary card link for performing the data transmission of the mobile network.

In the embodiments of the disclosure, the data to be transmitted is distributed to the primary card link and the secondary card link according to a ratio, and then the data transmission of the mobile network may be performed by the primary card link and the secondary card link, such that poor data transmission of the mobile network performed by the primary card link may be compensated by means of the capability of the secondary card link.

Furthermore, in the embodiments of the disclosure, in order to facilitate a user to determine the link currently used by the terminal for performing the data transmission of the mobile network, a primary card icon and a secondary card icon may be displayed. The primary card icon is configured to indicate that the data transmission of the mobile network is performed through the primary card link. The secondary card icon is configured to indicate that the data transmission of the mobile network is performed through the secondary card link.

In an embodiment, for a terminal of the 5G+4G network, if the terminal finds that the signal of the 5G network is poor or the link quality packet loss rate of the 5G network is high, the data packets to be transmitted currently may be proportionally distributed to the secondary card 4G network according to the quality evaluation results of the dual links, and uplink and downlink transmission with data packets of a 5G icon and a 4G icon may be displayed on a terminal display screen, but the quotas are different. In this manner, poor data transmission performed by the primary card 5G network may be compensated by means of the capability of the secondary card 4G network.

In another embodiment, when the data transmission of the mobile network performed by the primary card link is compensated through the secondary card link, if the primary card link is abnormal, the secondary card link may be switched to for performing the data transmission of the mobile network, such that poor data transmission of the mobile network performed by the primary card link may be compensated by means of the capability of the secondary card link.

Figure 3:
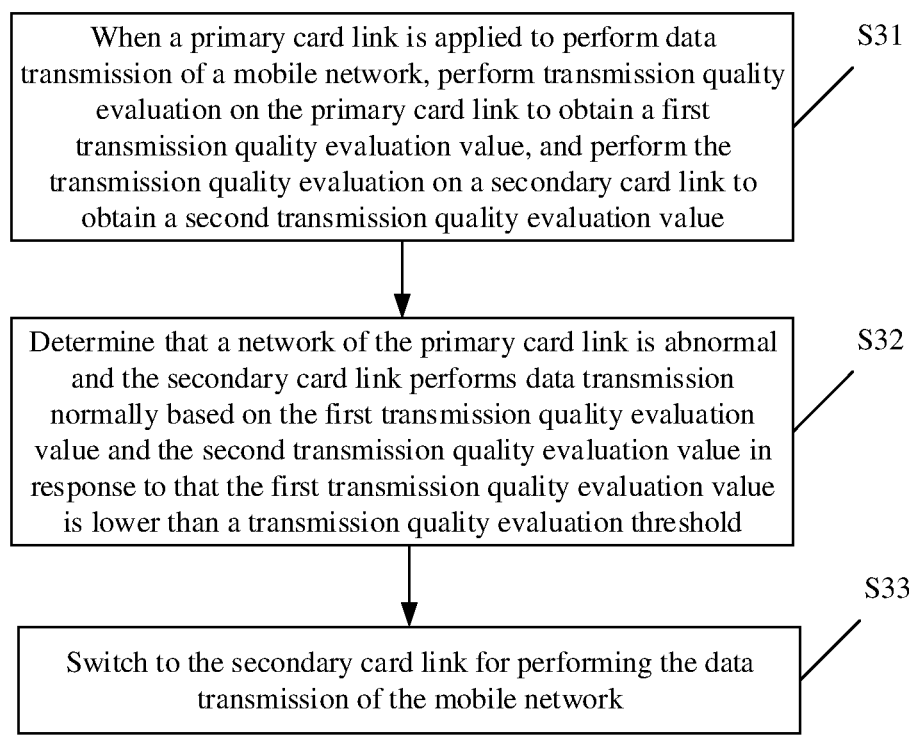
FIG. 3 is a flow chart of a data transmission method based on a mobile network according to an exemplary embodiment.

FIG. 3 is a flow chart of a data transmission method based on a mobile network according to an exemplary embodiment. As illustrated in FIG. 3, the data transmission method is applied to a terminal. The data transmission method includes the following operations.

At S31, when a primary card link is applied to perform data transmission of a mobile network, transmission quality evaluation is performed on the primary card link to obtain a first transmission quality evaluation value, and the transmission quality evaluation is performed on a secondary card link to obtain a second transmission quality evaluation value.

When transmission quality evaluation is performed on the primary card link and the secondary card link, quality evaluation may be performed based on signal parameters (such as signal receiving strength, signal quality, and the like) and a link quality packet loss rate of wireless communication, to obtain the first transmission quality evaluation value and the second transmission quality evaluation value.

At S32, it is determined that a network of the primary card link is abnormal and the secondary card link performs data transmission normally based on the first transmission quality evaluation value and the second transmission quality evaluation value in response to that the first transmission quality evaluation value is lower than a transmission quality evaluation threshold.

In the embodiments of the disclosure, if it is determined that the network of the primary card link is abnormal (for example, the link is unavailable), the data link may be switched to the secondary card link, and then the data transmission of the mobile network is performed through the secondary card link.

At S33, the secondary card link is switched to for performing the data transmission of the mobile network.

In the embodiments of the disclosure, the secondary card link may be switched to for performing the data transmission of the mobile network, such that poor data transmission of the mobile network performed by the primary card link may be compensated by means of the capability of the secondary card link.

Furthermore, in the embodiments of the disclosure, in order to facilitate a user to determine the link currently used by the terminal for performing the data transmission of the mobile network, a secondary card icon may be displayed to indicate that the data transmission of the mobile network is performed through the secondary card link.

In an embodiment, for a terminal of the 5G+4G network, if the terminal finds that the link of the 5G network is unavailable, the secondary card 4G network may be switched, and uplink and downlink transmission with data packets of a 4G icon may be displayed on a terminal display screen. In this manner, poor data transmission performed by the primary card 5G network may be compensated by means of the capability of the secondary card 4G network.

In the above embodiments of the disclosure, after the data transmission performed by the primary card link is compensated through the secondary card link, a state of the primary card link may be subsequently monitored, and transmission quality evaluation is performed on the primary card link. If the first transmission quality evaluation value is higher than the transmission quality evaluation threshold, the data transmission of the mobile network performed by the primary card link is restored.

In an embodiment, for the process of performing the data transmission of the mobile network by the primary card link and the secondary card link according to a ratio, the delay/packet loss rate of the primary card link may be monitored. If the delay/packet loss rate is lower than a specified delay/packet loss rate threshold, the process of performing the data transmission of the mobile network by the primary card link may be restored.

In an embodiment, for the process of switching to the secondary card link for performing the data transmission of the mobile network, after the data link is switched to the secondary card link, a primary card link reattachment process may be triggered, and the network is reselected. The state of the primary card link is monitored, and if it is detected that the primary card link is available, the primary card link may be switched to for performing the data transmission of the mobile network.

In the embodiments of the disclosure, after the data transmission of the mobile network performed by the primary card link is restored, the terminal displays a primary card icon to indicate that the data transmission of the mobile network is performed through the primary card link.

In the following embodiments of the disclosure, the primary card link is assumed to be a 5G link and the secondary card link is assumed to be a 4G link, to describe the process of the data transmission of the mobile network.

In the embodiments of the disclosure, transmission quality evaluation is performed on the primary card link when the primary card link is applied to perform data transmission of the mobile network. When the transmission quality of the primary card link is lower, the data transmission of the mobile network performed by the primary card link is compensated through the secondary card link, thereby realizing load fault tolerance and ensuring the data transmission quality of the mobile network.

Figure 4:
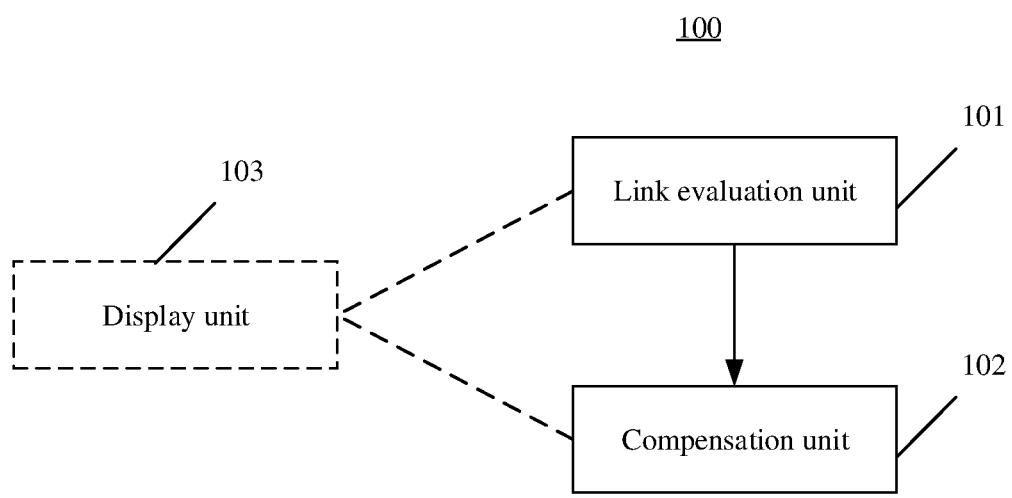
FIG. 4 is a block diagram of a data transmission device based on a mobile network according to an exemplary embodiment.

FIG. 4 is a block diagram of a data transmission device 100 based on a mobile network according to an exemplary embodiment. Referring to FIG. 4, the data transmission device 100 is applied to a terminal. The terminal is configured with a primary card link for a primary SIM card and a secondary card link for a secondary SIM card based on DSDS/DSDA. The device includes: a link evaluation unit 101 and a compensation unit 102.

The link evaluation unit 101 is configured to perform transmission quality evaluation on the primary card link when the primary card link is applied to perform data transmission of a mobile network, and obtain a first transmission quality evaluation value. The compensation unit 102 is configured to compensate the data transmission of the mobile network performed by the primary card link through the secondary card link in response to that the first transmission quality evaluation value is lower than a transmission quality evaluation threshold.

In an embodiment, the link evaluation unit 101 is further configured to perform the transmission quality evaluation on the secondary card link, and obtain a second transmission quality evaluation value. The compensation unit 102 is configured, when compensating the data transmission of the mobile network performed by the primary card link through the secondary card link, to compensate the data transmission of the mobile network performed by the primary card link through the secondary card link based on the first transmission quality evaluation value and the second transmission quality evaluation value.

In an embodiment, the compensation unit 102 is configured, when compensating the data transmission of the mobile network performed by the primary card link through the secondary card link based on the first transmission quality evaluation value and the second transmission quality evaluation value, to determine a ratio between the primary card link and the secondary card link for performing the data transmission of the mobile network based on the first transmission quality evaluation value and the second transmission quality evaluation value; and to perform the data transmission of the mobile network through the primary card link and the secondary card link according to the ratio.

In an embodiment, a ratio of a high transmission quality evaluation value is higher than a ratio of a low transmission quality evaluation value.

In an embodiment, the compensation unit 102 is configured, when compensating the data transmission of the mobile network performed by the primary card link through the secondary card link based on the first transmission quality evaluation value and the second transmission quality evaluation value, to determine that a network of the primary card link is abnormal and the secondary card link performs data transmission normally based on the first transmission quality evaluation value and the second transmission quality evaluation value; and to switch to the secondary card link for performing the data transmission of the mobile network.

In an embodiment, the compensation unit 102 is further configured to: monitor a state of the primary card link after the data transmission of the mobile network performed by the primary card link is compensated through the secondary card link; and restore the data transmission of the mobile network performed by the primary card link in response to that the first transmission quality evaluation value is higher than the transmission quality evaluation threshold.

In some embodiments, the data transmission device 100 based on a mobile network further includes a display unit 103. In an embodiment, the display unit 103 is configured to display a primary card icon and a secondary card icon. The primary card icon is configured to indicate that the data transmission of the mobile network is performed through the primary card link, and the secondary card icon is configured to indicate that the data transmission of the mobile network is performed through the secondary card link.

In an embodiment, the display unit 103 is configured to display a secondary card icon. The secondary card icon is configured to indicate that the data transmission of the mobile network is performed through the secondary card link.

In an embodiment, the display unit 103 is configured to display a primary card icon. The primary card icon is configured to indicate that the data transmission of the mobile network is performed through the primary card link.

In an embodiment, the link evaluation unit 101 is configured, when performing transmission quality evaluation, to perform quality evaluation based on signal parameters of a modem and a link quality packet loss rate of wireless communication. The signal parameters include signal receiving strength and signal quality.

Each of the above described units may be implemented as software, or hardware, or a combination of software and hardware.

With respect to the device in the above embodiment, the specific manners of performing operations by individual units therein have been described in detail in the embodiments regarding the method, which will not be repeated herein.

Figure 5:
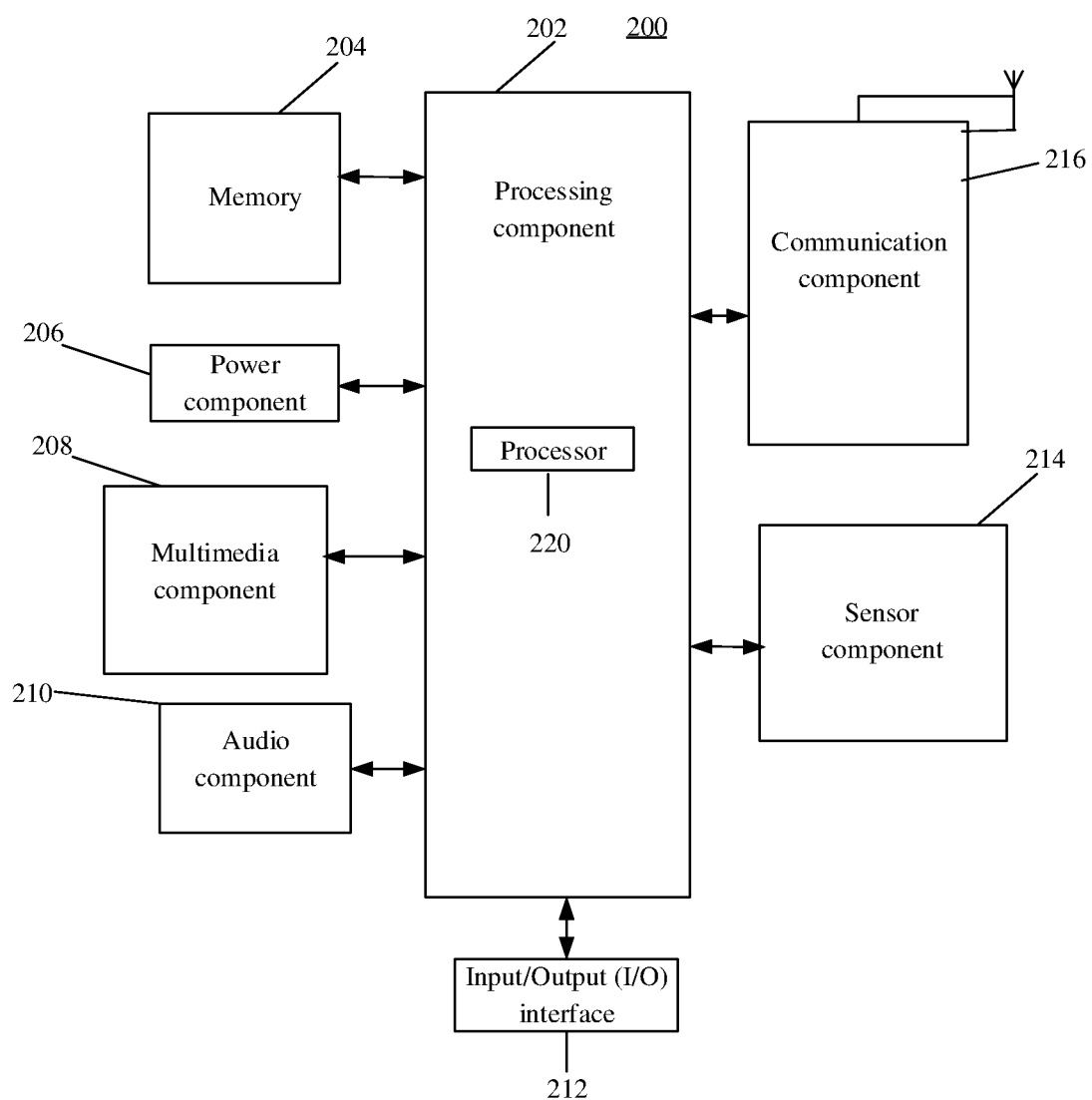
FIG. 5 is a block diagram of a device according to an exemplary embodiment.

FIG. 5 is a block diagram of a device 200 for data transmission of the mobile network according to an exemplary embodiment. For example, the device 200 may be a mobile phone, a computer, a digital broadcast terminal, a messaging device, a gaming console, a tablet, a medical device, exercise equipment, a personal digital assistant, and the like.

Referring to FIG. 5, the device 200 may include one or more of the following components: a processing component 202, a memory 204, a power component 206, a multimedia component 208, an audio component 210, an input/output (I/O) interface 212, a sensor component 214 and a communication component 216.

The processing component 202 typically controls overall operations of the device 200, such as the operations associated with display, telephone calls, data communications, camera operations, and recording operations. The processing component 202 may include one or more processors 220 to execute instructions to perform all or part of steps in the above method. Furthermore, the processing component 202 may include one or more modules which facilitate interaction between the processing component 202 and other components. For instance, the processing component 202 may include a multimedia module to facilitate interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, and the like. The memory 204 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 206 provides power for various components of the device 200. The power component 206 may include a power management system, one or more power supplies, and other components associated with generation, management and distribution of power for the device 200.

The multimedia component 208 includes a screen providing an output interface between the device 200 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 208 includes a front camera and/or a rear camera. When the device 200 is in an operation mode, such as a photographing mode or a video mode, the front camera and/or the rear camera may receive external multimedia data. Each of the front camera and the rear camera may be a fixed optical lens system or have focusing and optical zooming capabilities.

The audio component 210 is configured to output and/or input an audio signal. For example, the audio component 210 includes a microphone (MIC), and the MIC is configured to receive an external audio signal when the device 200 is in an operation mode, such as a call mode, a recording mode and a voice recognition mode. The received audio signal may further be stored in the memory 204 or sent through the communication component 216. In some embodiments, the audio component 210 further includes a speaker configured to output the audio signal.

The I/O interface 212 provides an interface between the processing component 202 and peripheral interface modules, such as a keyboard, a click wheel, buttons, and the like. The buttons may include, but are not limited to: a home button, a volume button, a starting button, and a locking button.

The sensor component 214 includes one or more sensors configured to provide status assessments in various aspects for the device 200. For instance, the sensor component 214 may detect an on/off status of the device 200, and relative positioning of components, such as a display and small keyboard of the device 200, and the sensor component 214 may further detect a change in a position of the device 200 or a component of the device 200, presence or absence of contact between the user and the device 200, orientation or acceleration/deceleration of the device 200 and a change in temperature of the device 200. The sensor component 214 may include a proximity sensor configured to detect presence of an object nearby without any physical contact. The sensor component 214 may also include a light sensor, such as a complementary metal oxide semiconductor (CMOS) or charge coupled device (CCD) image sensor, configured for use in an imaging application. In some embodiments, the sensor component 214 may also include an acceleration sensor, a gyroscope sensor, a magnetic sensor, a pressure sensor or a temperature sensor.

The communication component 216 is configured to facilitate wired or wireless communication between the device 200 and other devices. The device 200 may access a communication-standard-based wireless network, such as a wireless fidelity (WiFi) network, a 4th-generation (4G) or 5th-generation (5G) network or a combination thereof. In an exemplary embodiment, the communication component 216 receives a broadcast signal or broadcast associated information from an external broadcast management system through a broadcast channel In an exemplary embodiment, the communication component 216 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above method.

In an exemplary embodiment, there is also provided a non-transitory computer-readable storage medium including instructions, such as included in the memory 204, executable by the processor 220 of the device 200 for performing the above methods. For example, the non-transitory computer-readable storage medium may be a ROM, a random access memory (RAM), a compact disc read-only memory (CD-ROM), a magnetic tape, a floppy disc, an optical data storage device, and the like.

Terms used in the present disclosure are merely for describing exemplary embodiments instead of limiting the disclosure. For example, the terms "first," "second," and the like are used to describe various types of information, but the information should not be limited to the terms. The terms are only used to distinguish the same type of information from each other, and do not indicate a specific order or degree of importance. For example, without departing from the scope of the disclosure, first information may also be referred to as second information. Similarly, second information may also be referred to as first information.

Although the operations in the embodiments of the disclosure are described in a specific order in the drawings, it should not be understood that the operations are required to be performed in a specific order shown or in a serial order, or all the operations shown are required to be performed to obtain a desired result. In some embodiments, multitasking and parallel processing may be advantageous.

Other implementations of the present disclosure will be apparent to a person having ordinary skill in the art after considering the specification and practicing the disclosure. The present application is intended to cover any variation, use or adaptation of the disclosure, which follows the general principles of the disclosure and includes common knowledge or conventional technical means in the technical field not disclosed in the disclosure. The specification and the embodiments are exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A data transmission method based on a mobile network, applied to a terminal configured with a primary card link for a primary subscriber identity module (SIM) card and a secondary card link for a secondary SIM card, the method comprising:
   performing a transmission quality evaluation on the primary card link to obtain a first transmission quality evaluation value and performing the transmission quality evaluation on the secondary card link to obtain a second transmission quality evaluation value, in response to that the primary card link is applied to perform data transmission of the mobile network; and
   compensating the data transmission of the mobile network performed by the primary card link through the secondary card link based on the first transmission quality evaluation value and the second transmission quality evaluation value, in response to that the first transmission quality evaluation value is lower than a transmission quality evaluation threshold, wherein compensating the data transmission of the mobile network performed by the primary card link through the secondary card link comprises:
   determining a ratio between an amount of data to be transmitted by the primary card link and an amount of data to be transmitted by the secondary card link based on the first transmission quality evaluation value and the second transmission quality evaluation value, and
   performing the data transmission of the mobile network through the primary card link and the secondary card link according to the ratio.

2. The data transmission method of claim 1, wherein compensating the data transmission of the mobile network performed by the primary card link through the secondary card link based on the first transmission quality evaluation value and the second transmission quality evaluation value comprises:
   determining that a network of the primary card link is abnormal and the secondary card link performs data transmission normally based on the first transmission quality evaluation value and the second transmission quality evaluation value; and
   switching to the secondary card link for performing the data transmission of the mobile network.

3. The data transmission method of claim 2, further comprising:
   displaying a secondary card icon; wherein the secondary card icon is configured to indicate that the data transmission of the mobile network is performed through the secondary card link.

4. The data transmission method of claim 1, further comprising:
   monitoring a state of the primary card link after compensating the data transmission of the mobile network performed by the primary card link through the secondary card link; and
   restoring the data transmission of the mobile network performed by the primary card link in response to that the first transmission quality evaluation value is higher than the transmission quality evaluation threshold.

5. The data transmission method of claim 4, further comprising:
   displaying a primary card icon; wherein the primary card icon is configured to indicate that the data transmission of the mobile network is performed through the primary card link.

6. The data transmission method of claim 1, further comprising:
   displaying a primary card icon and a secondary card icon; wherein the primary card icon is configured to indicate that the data transmission of the mobile network is performed through the primary card link, and the secondary card icon is configured to indicate that the data transmission of the mobile network is performed through the secondary card link.

7. The data transmission method of claim 1, wherein performing the transmission quality evaluation comprises:
   performing quality evaluation based on signal parameters of a modem and a link quality packet loss rate of wireless communication, wherein the signal parameters comprise signal receiving strength and signal quality.

8. A data transmission device based on a mobile network, wherein the data transmission device is configured with a primary card link for a primary subscriber identity module (SIM) card and a secondary card link for a secondary SIM card, and comprises:
   a processor; and
   a memory for storing instructions executable by the processor;
   wherein the processor is configured to:
   perform a transmission quality evaluation on the primary card link to obtain a first transmission quality evaluation value and perform the transmission quality evaluation on the secondary card link to obtain a second transmission quality evaluation value, in response to that the primary card link is applied to perform data transmission of the mobile network; and
   compensate the data transmission of the mobile network performed by the primary card link through the secondary card link based on the first transmission quality evaluation value and the second transmission quality evaluation value, in response to that the first transmission quality evaluation value is lower than a transmission quality evaluation threshold, wherein in compensating the data transmission of the mobile network performed by the primary card link through the secondary card link, the processor is further configured to:

determine a ratio between an amount of data to be transmitted by the primary card link and an amount of data to be transmitted by the secondary card link based on the first transmission quality evaluation value and the second transmission quality evaluation value; and perform the data transmission of the mobile network through the primary card link and the secondary card link according to the ratio.

9. The data transmission device of claim 8, wherein the processor is further configured to:

determine that a network of the primary card link is abnormal and the secondary card link performs data transmission normally based on the first transmission quality evaluation value and the second transmission quality evaluation value; and switch to the secondary card link for performing the data transmission of the mobile network.

10. The data transmission device of claim 9, wherein the processor is further configured to:

display a secondary card icon; wherein the secondary card icon is configured to indicate that the data transmission of the mobile network is performed through the secondary card link.

11. The data transmission device of claim 8, wherein the processor is further configured to:

monitor a state of the primary card link after compensating the data transmission of the mobile network performed by the primary card link through the secondary card link; and restore the data transmission of the mobile network performed by the primary card link in response to that the first transmission quality evaluation value is higher than the transmission quality evaluation threshold.

12. The data transmission device of claim 11, wherein the processor is further configured to:

display a primary card icon, wherein the primary card icon is configured to indicate that the data transmission of the mobile network is performed through the primary card link.

13. The data transmission device of claim 8, wherein the processor is further configured to:

display a primary card icon and a secondary card icon; wherein the primary card icon is configured to indicate that the data transmission of the mobile network is performed through the primary card link, and the secondary card icon is configured to indicate that the data transmission of the mobile network is performed through the secondary card link.

14. The data transmission device of claim 8, wherein the processor is further configured to:

perform quality evaluation based on signal parameters of a modem and a link quality packet loss rate of wireless communication;

wherein the signal parameters comprise signal receiving strength and signal quality.

* * * * *